Figure 1:
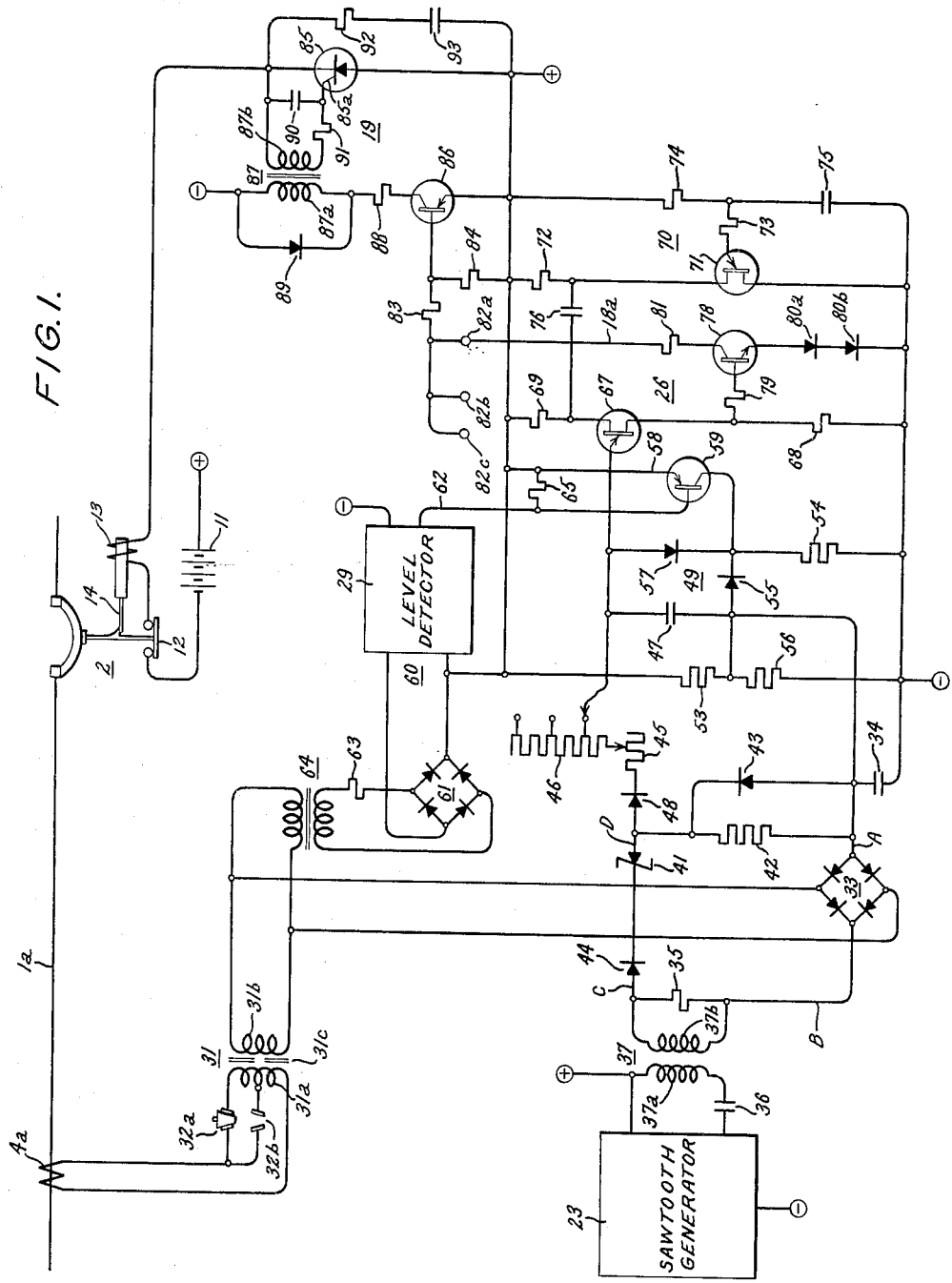

United States Patent Office 3,202,876
Patented Aug. 24, 1965

3,202,876
ELECTRIC SUPERVISING MEANS
Charles A. Mathews, Springfield, and Eugene M. Smith, West Chester, Pa., assignors to General Electric Company, a corporation of New York
Filed Aug. 1, 1961, Ser. No. 128,421
11 Claims. (Cl. 317—36)

This invention relates to means for supervising the accumulation of electric energy in a D.-C. energized reactance element such as a capacitor, and more particularly it relates to supervising means including a transistor for maintaining a capacitor discharged as long as the transistor is inactive (turned off).

Capacitors energized by D.-C. quantities are often used for performing time delay functions. For example, an inverse-time-overcurrent protective relay for an electric current circuit may utilize a timing capacitor in order to delay relay operation by an amount which is inversely related to a function of the degree of overcurrent in the circuit. In such a setting, accurate and consistent timing is obtained only if the capacitor starts its timing function from a fully discharged state each time an overcurrent condition occurs, and it is also important to reliable relay performance that the capacitor be quickly discharged or reset as soon as the overcurrent condition desists. These ends are both met by utilizing the supervising means here contemplated.

In the prior art of which we are now aware, it is conventional practice to maintain a timing capacitor in a discharged state by having connected in parallel therewith a low impedance circuit comprising an "active" component such as a closed switch contact or a conducting transistor. Whenever this component is opened or inactivated, the capacitor is able to start accumulating energy supplied from its D.-C. energizing circuit. Our invention is an antithesis of such an arrangement.

It is a general object of the present invention to provide improved supervising means, including normally inactive circuit means which provides a low impedance path only when active, for maintaining a D.-C. energized capacitor normally discharged, the capacitor being enabled to start charging in response to activation of the circuit means.

Another object of the invention is to provide in such supervising means only components having no moving parts, the components including only one transistor and the one transistor comprising the above-mentioned normally inactive circuit means.

A further object of our invention is the provision of improved means of economical design and unusually high-speed performance for supervising the charging and discharging of a D.-C. energized timing capacitor in a protective relay.

In carrying out our invention in one form, we provide means for supervising the accumulation of electric energy in a capacitor connected to a D.-C. energizing circuit, the supervising means including a diode which is connected to a suitable source of D.-C. supply voltage so as to be normally forward-biased, that is, conducting. We interconnect the diode and the capacitor so that no appreciable energy accumulation can take place in the capacitor as long as the diode is conducting. Shunt circuit means, comprising for example a transistor, is provided for interconnecting the diode and the source of D.-C. supply voltage in such a way as to reverse bias the diode upon activation of the shunt circuit means, whereupon the diode stops conducting and energy can then start to accumulate in the capacitor. In one aspect of our invention this supervising means is adapted to perform starting and resetting functions in an inverse-time-overcurrent protective relay whose timing function is performed by said capacitor.

Figure 2:
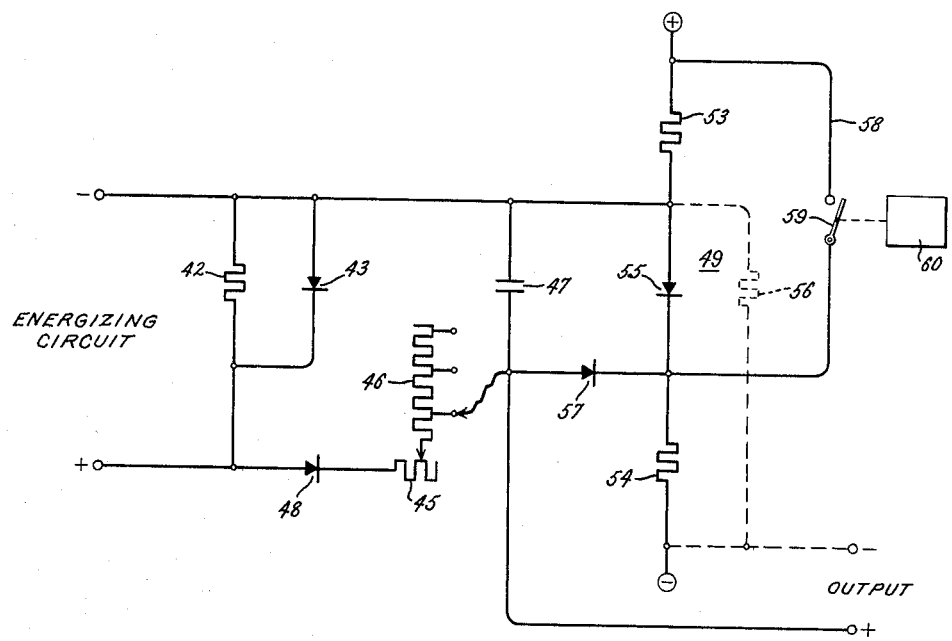

Our invention will be better understood and its various objects and advantages will be more fully appreciated from the following description taken in conjunction with the accompanying drawings in which:

FIG. 1 is a schematic circuit diagram of a protective relay illustrating a preferred embodiment of our invention; and FIG. 2 is another schematic circuit diagram showing the elements of the supervising means taken from the relay of FIG. 1 and partly reoriented in order to facilitate the exposition of our invention.

Referring now to FIG. 1, there is shown, schematically, protective relay means for an alternating-current electric power circuit 1a. The protected circuit 1a is intended to be connected to a suitable power source by means of a circuit breaker 2, and, while only a single-pole breaker 2 and a single circuit conductor 1a have been shown, it should be understood that what is represented in FIG. 1 may comprise but part of a complete 3-phase electric circuit and relaying system therefor.

The illustrated relay means is designed to initiate a predetermined control function, such as initiating an opening operation of the circuit breaker 2 in order to disconnect the circuit 1a from its power source, in delayed response to the occurrence of an abnormal circuit condition. Toward this end, the relay means is arranged to be energized in accordance with a characteristic electric quantity of the circuit 1a, and the value of this quantity, after it attains a predetermined "pickup" level, indicates the occurrence and severity of the abnormal condition to which the relay responds. In the illustrated application of the relay means, the characteristic electric quantity is alternating current, and therefore the relay is adapted to be inductively coupled by means of an instrument current transformer 4a to the circuit 1a.

The occurrence of an overload condition, a short circuit or the like in the protected circuit 1a will cause circuit current to rise above its normal full-load value—the degree of overcurrent being dependent upon the severity of the abnormal condition. Relay operation is desired in a delayed response to such an overcurrent condition, with the amount of delay being inversely related to the degree of overcurrent. In other words, the relay operating time is to be longer for small overcurrent values than at higher overcurrents.

As can be seen in FIG. 1, the relay means comprises transforming means 31 connected to the secondary winding of the current transformer 4a. The transforming means 31 includes primary and secondary windings 31a and 31b, respectively, and a magnetizable core 31c having an air gap, and preferably it is saturable or non-linear at high overcurrent values. The primary winding 31a, which is connected to the current transformer 4a, is provided with a plurality of preselected taps 32a and 32b so that the number of turns energized by the secondary current of the current transformer can be conveniently changed. In this way the pickup setting of the relay, measured in terms of current transformer secondary amperes, can be changed to suit the particular needs of several different relay applications.

The transforming means 31 derives across its secondary winding 31b an A.-C. voltage which is dependent upon the alternating current in the circuit 1a. This transforming means is designed so that its secondary voltage is linearly representative of the circuit current for a predetermined first range of overcurrent values. When current values exceed this first range, however, saturation begins and the secondary voltage increments will become progressively smaller as the secondary voltage approaches a predetermined maximum level.

Rectifying means, preferably comprising the full-wave bridge type rectifier 33 illustrated in FIG. 1, is connected to the secondary winding 31b of the transforming means 31 in order to provide a D.-C. signal which is used to control the energization of the timing circuit of the relay. The D.-C. signal comprises a succession of unipolarity half-cycle waves representative of the A.-C. voltage supplied to the rectifier, and hence representative of the alternating current in the circuit 1a; no filtering or smoothing means need be used. It is apparent, therefore, that the transforming means 31 in combination with the rectifier 33 comprise condition responsive means for deriving from circuit 1a a D.-C. signal (voltage) the effective magnitude of which is dependent upon the value of the circuit current. Since the transforming means 31 is in its linear region (not saturated) during relatively mild overcurrent conditions, the effective magnitude of the D.-C. signal will be directly proportional to the amount of circuit current throughout the aforementioned first range of overcurrent values.

The negative and positive D.-C. terminals of the rectifier 33 are connected, respectively, to conductors A and B. Conductor A is connected to a negative supply voltage terminal (the encircled minus symbol) through a surge suppressing capacitor 34 of very small capacitance. Throughout FIG. 1 the encircled plus and minus symbols, "+" and "−," are used to identify the positive and negative terminals, respectively, of a suitable source of regulated D.-C. supply voltage (not shown), the magnitude of this supply voltage being twenty volts, for example.

As is shown in FIG. 1, the positive D.-C. terminal of the rectifier 33 is connected by means of the conductor B to a resistor 35 which is supplied with a pulsating signal of triangular waveform by a pulsating signal (voltage) source comprising, in the preferred embodiment of the relay, a sawtooth generator 23. The sawtooth generator circuitry has not been shown in detail since we contemplate that it will be conventional. As a practical example, circuitry such as that described and claimed in United States Patent No. 2,792,499—Mathis, granted on May 14, 1957, could be used.

The output circuit of the sawtooth generator 23 is coupled by means of a capacitor 36 to the first winding 37a of a step-up transformer 37, and there is consequently developed in the second transformer winding 37b an A.-C. signal having a triangular waveform of substantially constant amplitude. The parameters of the generator 23 and the turns ratio of transformer 37 are selected so that the amplitude (peak magnitude) of this signal is a predetermined desired height (for example, 20 volts), and the signal frequency is arranged to be relatively high (for example, 2,000 cycles per second) compared to that of the alternating current in the circuit 1a (60 cycles per second, for example).

The transformer winding 37b is connected across the resistor 35 which, in turn, is connected between the conductor B and a conductor C. As is apparent in FIG. 1, the conductors A, B and C comprise adding means providing, between conductors A and C, a resultant signal corresponding to the sum of the D.-C. and A.-C. signals appearing at rectifier 33 and transformer winding 37b, respectively. The potential of conductor C, measured with respect to conductor A, is equal to the instantaneous magnitude of the D.-C. voltage across the rectifier 33 plus (or minus, during negative half cycles) the instantaneous magnitude of the serially related A.-C. voltage across the resistor 35. This adding function could be accomplished in ways other than by the series circuit shown; for example, the D.-C. signal and the pulsating triangular signal might comprise different currents flowing through a common resistor, whereby the resultant voltage drop across the resistor would reflect the sum of the superimposed currents.

In association with the adding means A, B, C illustrated in FIG. 1, appropriate impedance means 41 is provided for introducing, in subtractive relationship with the resultant signal which is developed between conductors A and C, a unipolarity reference signal level equal to the peak magnitude of the pulsating triangular-waveform signal appearing between conductors B and C. The impedance means 41 thus performs a biasing function. Preferably, as is shown in FIG. 1, the element 41 is a Zener diode or the like, such a device having an abrupt breakdown characteristic which enables it to block the flow of reverse current as long as the reversely poled applied voltage is less than a predetermined breakdown level, at which point it enables the reverse current to flow while limiting the voltage drop thereacross to the predetermined breakdown level.

The voltage breakdown level of the impedance means 41 is the unipolarity reference signal level referred to. In the illustrated embodiment of the relay, a Zener diode 41 having a 20-volt breakdown characteristic is used, and this determines the desired height of the A.-C. voltage amplitude across winding 37b. Hence the reference signal level is equivalent to the peak magnitude of the triangular-waveform pulsating signal supplied by the sawtooth generator 23. It will be understood by those skilled in the art that circuit elements other than a Zener diode might be satisfactorily used for establishing the unipolarity reference signal level; for example, a resistor energized by an appropriately poled 20-volt bias battery would have a similar effect.

As can be seen in FIG. 1, the Zener diode 41 is serially connected between conductor C of the adding circuit and another conductor D, and it is poled in opposition to the polarity of the rectifier 33. Accordingly, its breakdown voltage is subtracted from the resultant voltage provided across conductors A and C, and the difference or net voltage taken across conductors A and D is supplied to a resistor 42 connected therebetween. In order to ensure that the potential of conductor D will never go negative with respect to conductor A, an appropriately poled diode 43 is connected in parallel with the resistor 42, and another diode 44 is serially inserted between conductor C and the Zener diode 41, as shown.

Whenever, and to the extent that the resultant voltage magnitude exceeds the reference voltage level, a net voltage is developed across resistor 42 (between conductors A and D). The net voltage therefore comprises a succession of triangular D.-C. pulses whose frequency and waveform correspond to those of the pulsating triangular signal supplied by the sawtooth generator 23, with both height and base of each net voltage pulse being directly proportional to the magnitude of the D.-C. signal derived from the alternating current circuit 1a. It follows that the integrated area of these pulses during a full cycle of circuit current is directly proportional to the square of the effective magnitude of the D.-C. signal.

In FIG. 1 it will be seen that the adding circuit A, B, C, with the impedance means 41 in series therewith, has connected thereto electric energy storing means comprising the series combination of resistance elements 45 and 46 and a normally deenergized reactance element 47. This energy storing means is the adjustable-timing-circuit component of the relay. As shown in FIG. 1 the reactance element 47 is a capacitor, and preferably one having a capacitance of six microfarads is used. The resistance elements 45 and 46 are both potentiometers which enable time adjustments to be made in the operating characteristic of the relay means. The potentiometer 46 has a relatively large total resistance, such as 500,000 ohms, and it is provided with a plurality of taps at predetermined intervals for field selection of the desired time setting. The vernier potentiometer 45 is used for precise factory adjustment.

The elements 45–47 form an RC circuit, and this circuit is connected across the resistor 42 for energization in accordance with the net voltage developed between conductors A and D. As is shown in FIG. 1, a diode 48 is disposed between the potentiometer 45 and conductor D to block discharge of the capacitor 47 into its D.-C. energizing circuit. The relay circuitry hereinbefore described causes periodic energization of the RC circuit by a train of triangular-waveform voltage pulses recurring at a relatively high frequency (2,000 c.p.s.), and the timing capacitor 47 will be charged in a rapid succession of small steps or increments by this pulsating energizing quantity. The maximum magnitude and duration of each energizing pulse varies in accordance with the magnitude of the D.-C. signal (at rectifier 33) which is derived from the alternating-current circuit 1a.

The capacitor 47 is normally maintained in a discharged state by supervising means 49 associated therewith, and a description of the supervising means will follow hereinafter. Before that, however, it is appropriate to note that when capacitor charging is permitted, the time required for it to accumulate a predetermined amount of energy will be inversely proportional to approximately the square of the maximum instantaneous magnitude of the energizing quantity. If an exact inverse-square relationship between the capacitor charging time and the energizing quantity magnitude were desired, it could be obtained by inserting between the impedance means 41 and the resistor 42 of FIG. 1 a low-pass filter (not shown) arranged to derive a continuous D.-C. quantity the average magnitude of which is directly proportional to the square of the magnitude of the D.-C. signal at rectifier 33. In accordance with this alternative, the energy storing means of the relay in effect comprises two separate sections: a first section (the low-pass filter) which squares the difference or net voltage developed between conductors A and D; and a second section (the RC timing circuit) which integrates the squared quantity. But we prefer the illustrated relay embodiment because it yields a satisfactory degree of inverseness without the added expense and somewhat prolonged operating time (at high values of overcurrent) which would attend the use of a low-pass filter.

The supervising means 49 which normally prevents the accumulation of energy in the timing capacitor 47 will now be described. In accordance with our invention, this supervising means comprises two impedance elements or resistors 53 and 54 connected from the positive and negative D.-C. supply voltage terminals, respectively, to differently poled terminals of capacitor 47, and a diode 55 connected between these two resistors in parallel relationship with the capacitor. The positive electrode or anode of the diode 55 is connected to resistor 53; consequently it is poled in a blocking disposition relative to the D.-C. energizing circuit of capacitor 47 while being normally conductive with regard to current flowing from the positive supply voltage terminal through resistors 53 and 54 to the negative supply voltage terminal. A third resistor 56 is connected directly between the resistor 53 and the negative supply voltage terminal, across the combination of diode 55 and resistor 54. A second diode 57, poled in a conducting disposition relative to the capacitor energizing circuit, is serially connected between the negative electrode or cathode of the diode 55 and the relatively positive terminal of capacitor 47. As long as the diode 55 is conducting (forward biased), the potential difference across the terminals of capacitor 47 must necessarily be negligible, and no appreciable energy can be accumulated or stored therein.

Our supervising means 49 includes a normally inactive shunt circuit means 58 connected across the combination of the resistor 53 and the diode 55 in series therewith. The shunt circuit means, which preferably comprises the emitter-collector circuit of a PNP transistor 59 as is shown in FIG. 1, is arranged to provide, when active, a relatively low-impedance path between the positive supply voltage terminal and the cathode of diode 55. Consequently, activation of the shunt circuit means 58 renders the diode 55 non-conductive (reverse biased) and hence enables charging of capacitor 47 to take place. The second diode 57 keeps positive supply voltage potential from appearing on the relatively positive terminal of capacitor 47 when the shunt circuit means 58 is in its active (low-impedance) state. Whatever it is desired to have the normally deenergized capacitor 47 begin accumulating energy, the shunt circuit means 58 is activated by suitable starting means 60 associated with supervising means 49.

A fuller appreciation of our invention may be gained from considering FIG. 2 which depicts the supervising means 49 of FIG. 1 in a simplified schematic fashion. The various circuit elements and their interconnections in FIG. 2 are just the same as in FIG. 1, and the same identifying numerals have been used. However, in FIG. 2 the resistor 56 is shown in broken lines, and the transistor 19 is shown simply as a normally-open switch which is closed (hence activating the shunt circuit means 58) by the action of a suitable starting device 60 (shown in block form). All of the circuit elements have been re-oriented in FIG. 2 in order to facilitate a clearer understanding of their functions.

It will be observed in FIG. 2 that the diode 55, which is connected in series with the resistors 53 and 54 between the supply voltage terminals, will normally conduct a forward bias current having a magnitude determined by the magnitude of the supply voltage and the size of the resistors 53 and 54. Since this diode is also connected in parallel circuit relation to the timing capacitor 47, it serves while conducting to maintain both terminals of the capacitor at essentially the same potential, and consequently the capacitor must normally be discharged. This state of affairs will subsist as long as the shunt circuit means 58 is inactive and current supplied by the energizing circuit to the RC timing circuit does not exceed the aforesaid bias current. All current of smaller amounts which the energizing circuit supplies at this time is able to flow, in effect, backward through the diode 55, thereby reducing its net forward current to some magnitude less than that of bias current, and consequently the capacitor 47 cannot accumulate energy.

In order to remove the short circuit which the conducting diode 55 in effect provides around the capacitor 47, it is only necessary to activate the shunt circuit means 58 which is connected between the positive supply voltage terminal and the cathode of diode 55. This is accomplished, as indicated in FIG. 2, by activating or closing the switch 59, whereupon positive supply voltage potential is applied to the negative pole of the diode 55. As a result the diode 55 is reverse biased, and in this state it is ineffective to prevent energy accumulation in capacitor 47. As soon as the starting device 60 enables the switch 59 to again resume its normally open or inactive disposition, in which it is shown in FIG. 2, conduction in diode 55 is immediately restored thereby effecting a quick return (reset) of the capacitor 47 to a state of discharge. The diode 57 is disposed in the connection between capacitor 47 and the cathode of diode 55, with the interconnected electrodes of both diodes being poled alike, in order to isolate the capacitor from the positive supply voltage terminal when the shunt circuit means 58 is active, and the resistor 56 is utilized to provide a constant bias voltage in series with the capacitor for reasons to be explained hereinafter.

Returning now to FIG. 1, it will be seen that the starting means 60 which is associated with the supervising means 49 in the preferred embodiment of our invention comprises a full-wave bridge type rectifier 61 and a level detector 29. The output circuit 62 of the level detector is connected to the base electrode of the transistor 59 which is part of the supervising means 49. The input signal for the level detector 29 is provided by the rectifier 61 whose A.-C. terminals are connected through a resistor 63 and a 1:1 ratio isolating transformer 64 to the secondary winding 31b of the transforming means 31. Thus the level detector input and the D.-C. signal provided by rectifier 33 for the adding means A, B, C, described hereinbefore are both derived from the same source and have equal magnitudes, the magnitudes of both being correspondingly dependent upon the value of alternating current in the circuit 1a.

The level detector 29 comprises any suitable circuit arrangement capable of producing a negative-going output signal in high speed, switch-like response to its input signal attaining a predetermined pickup level. Since it is thought unnecessary to show circuitry details for a complete understanding of the present invention, reference is made to Patent 3,067,340 granted on December 4, 1962, to M. E. Hodges and assigned to the assignee of the present invention, in which a level detector particularly well suited for the present purposes is fully described and claimed.

The output circuit 62 of the level detector 29 is coupled to the positive supply voltage terminal by a load resistor 65, and the emitter-base junction of the transistor 59 is connected across resistor 65 as is shown in FIG. 1. When the level detector input signal reaches its pickup level, the immediately resulting output signal causes a voltage drop across the load resistor 65 and current flow is effected in the emitter-base junction of the transistor 59. This forward bias of the emitter-base junction activates or turns on the transistor, and consequently the shunt circuit means 58 is changed from its normally inactive (high impedance) state to an active (low impedance) one. As a result, the normally conducting diode 55 of the supervising means 49 is rendered non-conductive, and the capacitor 47 can start charging.

In a preferred embodiment of the invention, the predetermined pickup level to which the level detector 29 responds is selected so that the starting means 60 will operate as described above when the value of the voltage across the transformer secondary winding 31b attains four volts R.M.S. This 4-volt value of secondary voltage is attained when the alternating current in circuit 1a rises to a value which will be designated "pickup" current, the absolute value of circuit current at pickup being determined by the particular primary winding tap (32a, 32b) in use.

The level detector 29 is arranged to discontinue its output signal whenever its input signal falls below a predetermined dropout level, the dropout level preferably being selected to be at least 90 percent of the above-mentioned predetermined pickup level. Consequently, as soon as current in the circuit 1a decreases to a corresponding dropout value, the starting means 60 (which preferably "drops out" with no intentional time delay) can no longer sustain a forward bias at the emitter-base junction of the transistor 59. As a result, the transistor 59 is turned off (rendered non-conductive), and the shunt circuit means 58 returns to its normally inactive state. This removes the reverse bias of diode 55, and whatever charge may have been accumulated by the timing capacitor 47 is quickly dissipated by our supervising means 49, thereby resetting the relay. The parameters of the supervising means 49 preferably are so selected that in less than one-sixth of a second, following the inactivation of shunt circuit means 58, capacitor 47 is almost completely discharged or reset. This unusually rapid resetting action virtually eliminates the possibility that residual energy accumulation in the capacitor 47 might undesirably shorten the relay operating time if another overcurrent condition were to occur immediately after the circuit current falls below its dropout value.

During normal circuit conditions, the short circuit means 58 of the supervising means 49 will remain inactive, and consequently the capacitor 47 of the RC timing circuit is normally discharged and has no energy stored therein. However, in response to the occurrence of an abnormal circuit condition, as evidenced by the current in circuit 1a attaining at least its pickup value, the starting means 60 operates to activate the shunt circuit means 58, and the capacitor 47 is able to begin accumulating energy from its D.-C. energizing circuit as previously explained. Capacitor charging continues until the above-mentioned predetermined amount of energy has been accumulated, the time required for such accumulation being inversely related to the severity of the abnormal condition as reflected by the amount of overcurrent in the circuit 1a. At this point the capacitor voltage has built up to a predetermined critical level. In order to ensure ample energization to cause ultimate relay operation whenever capacitor charging is permitted, even if the circuit current should only slightly exceed its pickup value, a critical voltage level is chosen that is equal to the maximum instantaneous value of the D.-C. energizing signal (the net or difference voltage between conductors A and D in FIG. 1) produced when circuit current has a predetermined value well below the aforesaid pickup value. Preferably this last-mentioned predetermined value of circuit current is less than one-half the pickup value, and the critical level of capacitor voltage is two volts.

The attainment of the predetermined amount of accumulated energy in capacitor 47 is detected by suitable level detecting means 26 connected thereto. As is shown in FIG. 1, the preferred level detector 26 comprises a semiconductor double base diode 67 known in the art as a unijunction transistor. (A conventional unijunction transistor and its unique operating characteristics are disclosed, for example, in United States Patent No. 2,769,926—Lesk, granted on November 6, 1956.)

Base-one of the unijunction transistor 67 (the lower base electrode as viewed in FIG. 1) is connected to the negative supply voltage terminal by way of a resistor 68, and base-two is connected to the positive supply voltage terminal by way of a resistor 69. For improved temperature stability, the resistances of resistor 68 and 69 preferably are selected to be equal to each other. The emitter of the unijunction transistor 67 is connected directly to the relatively positive terminal of the timing capacitor 47.

So long as the potential of the unijunction transistor emitter is less positive with respect to base-one than a characteristic peak point emitter voltage, the unijunction transistor 67 is cut off or inactive (and consequently its interbase impedance is high), and only quiescent current flows through the base-one resistor 68. When its emitter potential is raised to this critical peak point emitter voltage, however, the unijunction transistor 67 abruptly changes to an active, relatively low-impedance state and there is an appreciable increase in current flowing through resistor 68. The succeeding relay circuits are designed to respond to this current increase, and activation or firing of the unijunction transistor 67 of the level detector 26 will initiate an output control signal of the inverse-time-overcurrent relay.

The relay circuitry thus far described, in its broad aspects, is the subject matter of Patent No. 3,079,533, granted on February 26, 1963, to W. C. Kotheimer and assigned to the assignee of the present invention.

The particular unijunction transistor 67 which we prefer to use as the level detector 26 is arranged for activation when the peak point emitter voltage has a value of ten volts. Since this device is to be activated in response to the timing capacitor 47 being charged to the critical voltage level of only two volts, as has been explained hereinabove, an 8-volt bias is provided in series with the capacitor voltage. This bias is conveniently provided by the resistor 56, connected as is shown in FIG. 1 between the relatively negative terminal of capacitor 47 and the negative supply voltage terminal, in conjunction with the resistor 53 of the supervising means 49. By appropriately choosing the resistance values of the resistors 53 and 55, the voltage drop across resistor 56, with the diode 55 reverse biased, is made just equal to eight volts. Selection of the desired bias voltage can be facilitated by adding a potentiometer (not shown) in between the two resistors 53 and 56. As is apparent in FIG. 1, the emitter voltage of the unijunction transistor 67 before activation thereof comprises the voltage of the capacitor 47 plus the bias voltage across resistor 56.

The unijunction transistor 67 is activated or fired when the energy being accumulated in capacitor 47 attains its predetermined critical level, whereupon the capacitor 47 is quickly discharged through a path including the then low-impedance emitter-base-one junction of the unijunction transistor and the resistor 68. Capacitor charging is accomplished in small, high frequency steps, as explained hereinbefore. The charging circuit includes the resistance elements 45 and 46, and these elements, in series combination with the capacitor 47, determine the time constant of the RC timing circuit. In order to obtain the desired maximum time delay in a reliable relay of the smallest possible physical size, the capacitance of capacitor 47 has been kept relatively small and the total resistance of elements 45 and 46 has been made quite large. This high resistance, which is in the emitter circuit of the unijunction transistor 67, could result in a "stalling" problem (to be explained below), particularly during low-grade overcurrent conditions when the emitter voltage of the unijunction transistor will be found approaching its peak point relatively gradually as the charge on capacitor 47 slowly nears its critical 2-volt level three seconds or longer after the start of capacitor charging.

A certain minimum value of emitter current (the peak point current, which may be .000005 ampere, for example, at an interbase voltage of 20 volts) is required to fire a unijunction transistor, and the emitter circuit must be capable, of course, of delivering current of at least this value in order to activate the device. It is known that the rate of emitter current increase toward this peak point, immediately before firing, characteristically begins increasing when the emitter voltage applied to the unijunction transistor is less than one-tenth of a volt below its peak point. If the the magnitude of the quantity energizing the timing circuit of the illustrated relay were not appreciably in excess of pickup (four volts), there is a possibility that the large resistance elements 44 and 45 might limit emitter current to a value less than peak point, in which case the peak point emitter voltage could not be reached. This possibility would materialize if the emitter current in the unijunction transistor 67, before activation, were sufficient to cause all of the relatively small increment of charge accumulated by capacitor 47 during each triangular pulse just prior to the attainment of the critical firing level to be drained off (discharged) before the next succeeding pulse appears. In other words, the peak point would never be reached and the unijunction transistor 67 would stall if the last small increments of capacitor charge necessary to raise the emitter voltage to its peak point were decrementially dissipated as rapidly as supplied.

To avoid the above-mentioned possiblity of stalling, the unijunction transistor 67 actually selected has a peak point emitter voltage whose nominal value is about twelve volts, and periodically active sampling means 70 is associated therewith for increasing the sensitivity thereof to the above-mentioned 10-volt level at predetermined time intervals. As can be seen in FIG. 1, the preferred sampling means 70 comprises another unijunction transistor 71 the base-one of which is connected directly to the negative supply voltage terminal. A resistor 72 is connected between the positive supply voltage terminal and base-two of the unijunction transistor 71, and the emitter of this device is connected through a current limiting resistor 73 to the junction of a resistor 74 and a capacitor 75 which are serially connected between the supply voltage terminals. Thus a well-known relaxation oscillator is formed, and it is coupled to the unijunction transistor 67 by means of a suitably small capacitor 76 which interconnects the base-two electrodes of both unijunction transistors 67 and 71.

The parameters of the sampling means 70 are so selected that the predetermined time intervals between active moments thereof are each from two to eight times longer than the period of the triangular-waveform signal pulses supplied by the sawtooth generator 23. Preferably the sampling means is arranged to operate at a frequency of 300 cycles per second, and therefore there are 6⅔ cycles of the sawtooth generator per cycle of the sampling means. Each time the sampling means 70 is active, it causes the base-two potential of the unijunction transistor 67 to be depressed by a sufficient amount to reduce the peak point emitter voltage (which is dependent upon the interbase voltage) to the requisite ten volts.

Three-hundred times a second the periodically active sampling means 70 enables the unijunction transistor 67 of the level detector 26 to respond if the capacitor 47 has accumulated enough energy during the preceding 6⅔ energizing pulses to raise the total capacitor charge above the predetermined critical firing level. It will be apparent that this arrangement virtually eliminates the above-discussed problem of stalling. During the .003-second time interval between active moments of the sampling means 70, the emitter voltage applied to unijunction transistor 67 will be well below its nominal peak point (about twelve volts), and the emitter current is then negligible. As a result, the amount of capacitor charge that can be drained off between consecutive energizing pulses is so very small that a significant net increase in emitter voltage is always obtained during each time interval, even if the interval overlaps a moment at which the half-cycle wave of the D.-C. signal at rectifier 33 goes to zero. At the expiration of an appropriate time delay, the emitter voltage will be increased during one of the sampling intervals from a value below to a value at least as great as the 10-volt peak point, and when the sampling means 70 is next active, firing of the unijunction transistor is assured. This beneficial result has been achieved at the expense of delaying the relay operating time by a maximum of three milliseconds which is not long enough, even under severe overcurrent conditions when very short-time response is desired, to affect adversely the performance of the relay.

The above-described sampling means is subject matter of a copending patent application, S.N. 128,472 filed on August 1, 1961, for C. A. Mathews and assigned to the assignee of the present invention, now patent No. 3,179,850.

It has been pointed out hereinbefore that when the unijunction transistor 67 fires or is activated, there is an appreciable current increase in the base-one resistor 68. As is shown in FIG. 1, the resistor 68 has connected in parallel circuit relationship therewith the emitter-base junction of a signal amplifying NPN transistor 78. A current limiting resistor 79 is connected in series with the base electrode of transistor 78, and a pair of silicon diodes 80a and 80b, poled in agreement with the emitter-base junction, are serially connected to its emitter. The collector of this transistor is connected by way of a relatively small isolating resistor 81 and conductor 18a to an input terminal 82a of the static switch 19, terminal 82a being connected through a load resistor 83 and another resistor 84 to the positive terminal of the supply voltage source. It is apparent, therefore, that the signal amplifying transistor 78 will be turned on (become active) when its emitter-base junction is forward biased as a result of base-one current flowing from the unijunction transistor 67 upon activation thereof.

The diodes 80a and 80b are provided to ensure that the transistor 78 is not operated by the quiescent current of the unijunction transistor 67. Since each silicon diode inherently presents a relatively high impedance to the passage of a small quantity of forward current, the quiescent current of the unijunction transistor 67 prefers to follow a path through resistor 68, thereby avoiding activation of the transistor 78 which would take place if it were able to follow the parallel path through the emitter-base junction of this transistor. As a result, the transistor 78 will remain inactive until the unijunction transistor 67 has actually been fired.

The signal amplifying transistor 78, when active, produces a negative-going output control signal at a conductor 18a which emanates from the relay means. This signal is applied to an input terminal 82a of a static switch 19 for the purpose of initiating an opening operation of the circuit breaker 2, thereby disconnecting the protected circuit 1a from its source of power and hence interrupting the overcurrent flowing therein. Identical relay means (not shown) associated with companion electric current circuits will operate in the same way to supply similar output control signals to two other input terminals 82b and 82c, respectively, of the static switch 19, and all three input terminals are joined together as is indicated in FIG. 1. In lieu of a static switch, an electromagnetic relay or some other circuit controlling device could be used, if desired, to perform the function of the switch 19 which has been shown.

The static switch 19 in the illustrated embodiment of the inverse-time-overcurrent relay preferably comprises a solid state controlled rectifier 85. As is shown in FIG. 1, the relatively positive and negative electrodes (the anode and cathode) of this device are connected, respectively, to the positive terminal of a battery 11 and to a trip coil 13 of the circuit breaker 2. Until fired or activated by a small "gate" current in its gate electrode 85a, the controlled rectifier 85 blocks current flow in both directions and hence is in effect an open circuit. When activated, however, it will abruptly change to a low-forward-impedance state which enables sufficient current to flow in the tripping circuit 11–12–13 of the circuit breaker 2 for the trip coil 13 to effect actuation of the breaker latch 14, and the switch member of the breaker thereby is released for rapid circuit opening movement. Since its anode current then exceeds a predetermined minimum value (the "holding current") required to sustain conduction in a controlled rectifier of the type illustrated, this device will remain active until the breaker auxiliary switch 12 opens, even if the gate signal were quickly removed.

In order to initiate firing of the controlled rectifier 85 whenever input terminal 82a is energized by a negative-going control signal, a PNP transistor 86 and a pulse transformer 87 have been provided. As can be seen in FIG. 1, the transistor emitter is connected directly to the positive supply voltage terminal, while its collector is connected by way of a resistor 88 and the primary winding 87a of the pulse transformer 87 to the negative supply voltage terminal. The secondary winding 87b of the pulse transformer is connected between the cathode and gate electrode of the controlled rectifier 85. A diode 89 disposed across the primary winding 87a and poled as shown serves to limit the peak secondary voltage which can be induced in the winding 87b, upon deactivation of the static switch, to less than the maximum permissible reverse gate voltage of the controlled rectifier 85. A connection is made from the base electrode of the transistor 86 to the junction between resistors 83 and 84, the resistor 84 being the base resistor of this transistor.

Normally the potential level at the input terminal 82a of the static switch 19 is nearly the same as that of the positive supply voltage terminal, negligible current can flow through the resistors 84 and 83, and the transistor 86 is necessarily turned off (inactive). However, as soon as the output control signal is developed by the relay means, the input terminal 82a will become energized by a negative potential almost equal to the magnitude of the supply voltage, and current flow is immediately effected in the emitter-base junction of transistor 86. This activates the transistor 86 and causes a rapid current increase in the primary winding 87a of the pulse transformer 87. As a result, the secondary winding 87b, which is connected in the gate circuit of the controlled rectifier 85, supplies gate current in the proper direction and of appropriate magnitude and duration to fire this device.

Since the controlled rectifier 85 is relatively sensitive, and only a small gate signal is required to fire it, it is important to prevent stray voltage transients or surges in the relay circuit from activating the static switch at some impropitious moment. Toward this end, the gate circuit of the controlled rectifier is provided with a surge suppressing combination of a capacitor 90 of small capacitance, connected between cathode and gate electrode, and a very small resistor 91 serially connected between the gate electrode and the pulse transformer secondary winding 87b. In addition, as can be seen in FIG. 1, the anode-cathode circuit of the controlled rectifier is provided with the surge suppressing series combination of an even smaller resistor 92 and a capacitor 93 connected thereacross. It will be recognized by those skilled in the art that these surge suppressing arrangements will absorb short-term transient surges thereby ensuring that the controlled rectifier will not be fired except, as described above, in response to a genuine control signal being applied to the input terminal 82a.

From the foregoing detail description of the circuitry and operation of the various functional components of the relay which is depicted in FIG. 1, the overall mode of operation may now be readily followed. For this purpose it will first be assumed that the protected circuit 1a has been subjected to an abnormality which causes a sudden increase in circuit current to an overcurrent value 2½ times greater than pickup. This is a relatively mild overcurrent condition, and the circuit current is still within the aforementioned first range of overcurrent values. Therefore the saturable transforming means 31 is operating in its linear region, and the value of secondary A.-C. voltage derived thereby will be 2½ times the 4-volt pickup level, or 10 volts R.M.S. Of course the starting means 60 instantaneously responds to any transformer secondary voltage in excess of pickup, and it activates the transistor 59 in the shunt circuit means 58 of the supervising means 49. As a result, the normally conducting diode 55, which had been preventing the timing capacitor 47 of the energy storing means 25 from charging, has positive supply voltage potential applied to its negative pole and is thereby rendered non-conductive, whereupon the capacitor 47 immediately begins accumulating energy supplied thereto by its D.-C. energizing circuit.

The timing capacitor 47 is supplied with a rapid succession of triangular energizing pulses. These pulses recur at a constant frequency of 2,000 c.p.s., as determined by the sawtooth generator 23 which is producing, between conductors B and C in the adding circuit A, B, C, a triangular waveform A.-C. voltage of constant amplitude. The height and duration of each net voltage pulse is determined by the D.-C. voltage which the rectifier 33 provides between conductors A and B in FIG. 1. The D.-C. voltage, being derived from the protected circuit 1a by way of transformer 31 and hence being representative of the circuit current, has a magnitude of 10 volts R.M.S., corresponding to 2½ times pickup. Since the net voltage energizing the timing circuit comprises the sum of these A.-C. and D.-C. voltages less the unipolarity reference voltage level which is introduced by the impedance means 41 between conductors C and D, the height of each net voltage triangle is in fact equal to the instantaneous magnitude of the D.-C. voltage at the same moment of time, and it follows that the integrated area of the energizing pulses during a full cycle of circuit current will be directly proportional to the square of the effective magnitude of the D.-C. voltage.

The timing capacitor 47 is incrementally charged by the chain of triangular energizing pulses until the predetermined critical energy level is attained therein. In the example being considered it may be assumed that the potentiometers 45 and 46 have been adjusted so that this will take about nine-tenths of a second, which corresponds to about 1800 cycles of the sawtooth generator. Since the capacitor voltage at its critical level is only two volts, it is apparent that at 2½ times pickup the average voltage gain per energizing pulse is very small. At the expiration of the designated time delay, the capacitor charge finally attains the predetermined magnitude which, in conjunction with the 8-volt bias provided by the resistor 56 in circuit therewith, will raise the emitter voltage on the unijunction transistor 67 of the level detector 26 to its critical 10-volt level. This is the peak or firing point of the unijunction transistor 67 whenever the sampling means 70 is active.

The sampling means 70, which is periodically active at the rate of 300 times a second, will be active and thereby enable the unijunction transistor 67 to fire at some time within .003-second following the critical energy level attainment in capacitor 47. In response to this event, the signal amplifying transistor 78 is turned on and a negative-going output control signal is produced at 18a. In the illustrated embodiment of the invention, this output signal initiates opening of a circuit breaker by activating the transistor 86 which causes a firing signal to be developed in the gate circuit of the controlled rectifier 85 of the static switch 19. As is indicated in FIG. 1, the consequent firing or activation of the controlled rectifier completes the energizing circuit for the breaker trip coil 13.

In further explanation of the mode of operation of the illustrated inverse-time-overcurrent relay, a second operating example will now be considered. Let it be assumed that a more severe abnormal circuit condition has occurred, and the current in circuit 1a suddenly rises to an overcurrent value 8 times greater than pickup. This current value, as will be explained hereinafter, is beyond the aforementioned first range of overcurrent values, and consequently the saturable transforming means 31 will be in its non-linear region. Assume, therefore, that the secondary A.-C. voltage derived by the transforming means 31 is only 7½ times the 4-volt pickup level, or 30 volts R.M.S.

The starting means 60 will again respond instantaneously to activate the shunt circuit means 58, whereupon the supervising means 49 enables the timing capacitor 47 immediately to start accumulating energy. Since the D.-C. voltage which is applied to the adding circuit A, B, C by rectifier 33 reflects the increased value of secondary voltage derived by the transformer 31, the timing circuit 25 is now energized by a train of triangular net voltage pulses having three times the height and duration as before. But three times the duration (base) of those several triangular pulses of highest magnitude each half-cycle of circuit current will exceed the period of the high-frequency A.-C. voltage which is supplied by the sawtooth generator 23, and consequently the energization supplied to the timing circuit, for the particular condition assumed, will cease being a periodic quantity and will actually become continuous for approximately 40 electrical degrees every half cycle of circuit current. It is apparent, therefore, that the integrated area of the energizing pulses during a full cycle of circuit current at 8 times pickup will be slightly less than nine times greater than the corresponding area at 2½ times pickup.

Under the more severe overcurrent condition now being considered, with no change in the relay's timing adjustment, the capacitor 47 will take about .09-second to accumulate the predetermined amount of energy required for firing the unijunction transistor 67 when the sampling means 70 is active. As before, this response of the level detector 26 produces an output control signal at 18a, and the static switch 19 is activated thereby to perform its breaker trip coil energizing functions.

From the foregoing description of operation at 8 times pickup, it will be apparent that when the maximum magnitude of the D.-C. voltage applied to the adding circuit A, B, C of the relay exceeds the peak-to-peak magnitude (40 volts) of the pulsating triangular signal, the value of the net D.-C. signal energizing the time delay circuit 25 will be continuously finite for at least two successive cycles of the sawtooth generator 23 each half cycle of circuit current, and the relay tends to operate more slowly than would be expected at high multiples of pickup with a true $I^2t$ relationship. This tendency, which becomes more pronounced as the circuit current increases, is augmented by the nonlinearity of transforming means 31 which tends to limit the D.-C. voltage, relative to the circuit current from which it is derived, whereby this voltage increases proportionately less than circuit current.

In practice the transforming means 31 preferably is designed to begin saturating when the current in circuit 1a attains a value of the order of six or seven times pickup and thereafter progressively to limit the magnitude of the representative D.-C. voltage which is derived therefrom. By arranging the transforming means to have an appropriately high degree of nonlinearity, a desired deviation of the relay operating characteristic, in a prolonged-time sense, from a true $I^2t$ relationship at relatively high multiples of pickup current is obtained. For further information about this feature of the illustrated relay, see the aforesaid Mathews Patent 3,179,850.

While a preferred form of our invention has been shown and described by way of illustration, many modifications will occur to those skilled in the art. It is contemplated, therefore, by the claims which conclude this specification to cover all such modifications as fall within the true spirit and scope of the invention.

What we claim as new and desire to secure by Letters Patent of the United States is:

1. Means for initiating a predetermined control function in delayed response to the occurrence of an abnormal condition in an electric current circuit, the amount of delay being inversely related to the severity of the abnormal condition, comprising: condition responsive means adapted to be coupled to the circuit for deriving therefrom a D.-C. signal having a magnitude which is dependent upon the value of a characteristic electric quantity of the circuit; a pulsating signal source for supplying a succession of triangular-waveform signal pulses; adding means connected to said condition responsive means and to said pulsating signal source for providing a resultant signal corresponding to the sum of the D.-C. and pulsating signals; means associated with said adding means for introducing, in subtractive relationship with the resultant signal, a unipolarity reference signal level equivalent to the peak magnitude of the pulsating signal; electric energy storing means, including a reactance element, connected in said adding means for energization in accordance with the difference between the resultant signal magnitude and the reference signal level whenever the former exceeds the latter; supervising means associated with said reactance element for normally preventing the accumulation of energy therein, the supervising means including a first resistor, a normally conducting diode and a second resistor serially interconnected in the named order between a pair of D.-C. supply voltage terminals, means connecting said reactance element in parallel circuit relation with the diode, the diode being poled in a blocking disposition relative to the energizing circuit of the reactance element, and normally inactive shunt circuit means connected across the combination of one of said resistors and the diode in series therewith to provide, when active, a relatively low impedance path which renders the diode non-conductive and hence enables the reactance element to accumulate energy; starting means coupled to the electric current circuit and connected to said supervising means for changing said shunt circuit means from its normally inactive state to an active state in response to the occurrence of an abnormal circuit condition; and level detecting means, connected to said reactance elements, adapted to initiate the predetermined control function in response to the accumulation in said element of a predetermined amount of energy.

2. Relay means for initiating a predetermined control function in delayed response to the occurrence of an overcurrent condition in an electric current circuit, the relay means having an inverse-time-overcurrent operating characteristic, comprising: condition responsive means adapted to be coupled to the circuit for deriving therefrom a D.-C. voltage having a magnitude which is dependent upon the value of current in the circuit; an A.-C. voltage source for supplying a triangular waveform voltage of substantially constant amplitude; an adding circuit to which said D.-C. and A.-C. voltages are serially applied for providing a resultant voltage equal to the sum of the D.-C. and A.-C. voltages; means associated with said adding circuit for introducing, in subtractive relationship with said resultant voltage, a unipolarity reference voltage level equal to the amplitude of said A.-C. voltage; electric energy storing means, including a normally discharged capacitor, connected to said adding circuit for energization in accordance with the difference between the resultant voltage magnitude and the reference voltage level whenever the former exceeds the latter, whereby the time required for the capacitor voltage to attain a predetermined critical level when capacitor charging is permitted is inversely related to the value of current in the electric current circuit, said predetermined critical voltage level corresponding to a first predetermined value of circuit current; supervising means associated with said capacitor for normally maintaining it discharged, the supervising means including positive and negative D.-C. supply voltage terminals, a first resistor connected between the positive supply voltage terminal and a relatively negative terminal of the capacitor, a second resistor connected between the negative supply voltage terminal and a relatively positive terminal of the capacitor, a diode connected between the first and second resistors in parallel relationship with the capacitor, the diode having its positive electrode connected to the first resistor, and normally inactive shunt circuit means connected between one of the supply voltage terminals and the oppositely poled electrode of said diode to provide, when active, a relatively low impedance path therebetween, whereby said diode is rendered non-conductive and hence capacitor charging can take place in response to the activation of the shunt circuit means; starting means coupled to the electric current circuit and connected to said supervising means for changing said shunt circuit means from its normally inactive state to an active state in response to the attainment of a second predetermined value of current in the electric current circuit, said second predetermined value being higher than said first predetermined value; and level detecting means, connected to said capacitor, adapted to initiate the predetermined control function in response to the capacitor being charged to said predetermined critical voltage level.

3. The relay means of claim 2 in which the supervising means includes another diode serially connected between the capacitor and said oppositely poled electrode of the first-claimed diode, with the interconnected electrodes of both diodes being poled alike, and a third resistor connected between the other supply voltage terminal and the other electrode of the first-claimed diode, and in which the level detecting means is arranged for response to the capacitor voltage taken in series with the voltage across said third resistor.

4. In an overcurrent protective relay for an alternating current circuit, the combination of: condition responsive means adapted to be coupled to the circuit for deriving therefrom a representative D.-C. signal; a pulsating signal source for supplying a rapid succession of triangular-waveform signal pulses; impedance means for establishing a unipolarity reference signal level equivalent to the peak magnitude of the pulsating signal; energy storing means, comprising resistance and capacitance elements connected in series combination, disposed for energization by a quantity derived from the D.-C. signal plus the pulsating signal minus the reference signal; supervising means associated with said capacitance element for normally maintaining it discharged, the supervising means including a first resistor, a normally conducting diode and a second resistor serially interconnected in the named order between a pair of D.-C. supply voltage terminals, means connecting the diode in parallel circuit relation to said capacitance element with the diode being poled in a blocking disposition relative to the quantity energizing the capacitance element, and normally inactive shunt circuit means connected across the combination of one of said resistors and the diode in series therewith to provide, when active, a relatively low impedance path which renders the diode non-conductive and hence enables the capacitance element to start charging; starting means adapted to be coupled to the alternating current circuit and connected to said supervising means for changing said shunt circuit means from its normally inactive state to an active state in response to an overcurrent circuit condition; and a level detector connected to said capacitance element for producing an output control signal in response to the capacitance element being charged a predetermined amount.

5. The overcurrent protective relay of claim 4 in which a silicon controlled rectifier is connected to the level detector for performing a predetermined control function in response to the production by the level detector of the output control signal.

6. Means for supervising the accumulation of electric energy in a capacitor arranged for D.-C. energization, comprising: positive and negative D.-C. supply voltage terminals; first and second impedance means connected from said positive and negative supply voltage terminals, respectively, to differently poled terminals of the capacitor; a diode connected between the first and second impedance means in parallel relationship with the capacitor, the diode being so poled as to conduct current flowing through said first and second impedance means thereby preventing, while conducting, the accumulation of electric energy in the capacitor; shunt circuit means connected between one of the supply voltage terminals and the oppositely poled electrode of the diode to provide, when active, a relatively low impedance path therebetween, whereby said diode is rendered non-conductive and energy accumulation in the capacitor can take place in response to the activation of the shunt circuit means; and means for activating the shunt circuit means when said energy accumulation is desired.

7. The supervising means of claim 6 in which the shunt circuit means comprises the emitter-collector circuit of a transistor.

8. Means for supervising the accumulation of electric energy in a reactance element arranged for connection to a D.-C. energizing circuit, comprising: positive and negative D.-C. supply voltage terminals; a first resistor connected between the positive supply voltage terminal and a relatively negative terminal of the reactance element; a second resistor connected between the negative supply voltage terminal and a relatively positive terminal of the reactance element; a diode connected between the first and second resistors in parallel relationship with the reactance element, the diode having its positive electrode connected to the first resistor and its negative electrode connected to the second resistor; shunt circuit means connected between one of the supply voltage terminals and the oppositely poled electrode of the diode to provide, when active, a relatively low impedance path therebetween; means connected between said reactance element and said oppositely poled electrode for isolating said reactance element from said one supply voltage terminal when said shunt circuit means is active; and means for changing the state of the shunt circuit means from an inactive one to an active one.

9. Means for supervising the accumulation of electric energy in a capacitor arranged for connection to a D.-C. energizing circuit, comprising: a first impedance means, a normally conducting first diode and a second impedance means serially interconnected in the named order between a pair of D.-C. supply voltage terminals; means for connecting the first diode in parallel circuit relation to the capacitor with the first diode being poled in a blocking disposition relative to the energizing circuit of the capacitor; third impedance means connected across the combination of the first diode and a predetermined one of the first and second impedance means; normally inactive shunt circuit means connected across the combination of the first diode and the other one of the first and second impedance means to provide, when active, a relatively low impedance path which renders the first diode non-conductive in which state energy accumulation in the capacitor can take place; means for activating the shunt circuit means when said energy accumulation is desired; and a second diode serially disposed in the connection between the capacitor and the first diode terminal to which the shunt circuit means is connected, with the second diode being poled in a conducting disposition relative to the energizing circuit of the capacitor.

10. Relay means for initiating a predetermined control function in delayed response to the occurrence of an overcurrent condition in an alternating current circuit, the amount of delay being inversely related to the amount by which the circuit current exceeds a predetermined pickup value, comprising: transforming means adapted to be coupled to the circuit for deriving therefrom an A.-C. voltage dependant upon the alternating current in the circuit; rectifying means connected to said transforming means for providing a D.-C. signal having a magnitude determined by the value of said A.-C. voltage; electric energy storing means, including a normally de-energized reactance element, coupled to said rectifying means, the energization of said energy storing means being controlled by said D.-C. signal; supervising means associated with said reactance element for normally preventing the accumulation of energy therein, the supervising means including a first resistor, a normally conducting diode and a second resistor serially interconnected in the named order between a pair of D.-C. supply voltage terminals, means connecting the diode in parallel circuit relation to said reactance element with the diode being poled in a blocking disposition relative to the energizing circuit of the reactance element, and normally inactive shunt circuit means connected across the combination of one of said resistors and the diode in series therewith to provide, when active, a relatively low impedance path which renders the diode non-conductive and hence enables the reactance element to accumulate energy; starting means connected between the transforming means and said supervising means to change said shunt circuit means from its normally inactive state to an active one in response to said A.-C. voltage exceeding a value corresponding to said predetermined pickup value of the circuit current; and level detecting means, connected to said reactance element, adapted to initiate the predetermined control function in response to the reactance element accumulating a predetermined amount of energy.

11. In an overcurrent protective device, the combination of: means adapted to be coupled to a source of alternating current for producing a pulsating D.-C. energizing signal dependent upon the value of said alternating current; means comprising a normally discharged capacitor connected to said first-mentioned means for energization in accordance with said signal; supervising means associated with said capacitor for normally maintaining it discharged, the supervising means including a first resistor, a normally forward-biased diode and a second resistor serially interconnected in the named order between a pair of D.-C. supply voltage terminals, means interconnecting the capacitor and the diode for preventing the capacitor from accumulating an appreciable amount of charge so long as the diode is forward biased, and normally inactive shunt circuit means connected across the combination of one of said resistors and the diode in series therewith, the shunt circuit means, when active, causing the diode to be reverse biased thereby enabling capacitor charging to take place; means connected to said supervising means and responsive to predetermined overcurrent conditions in said source for changing said shunt circuit means from its normally inactive state to an active state; and level detecting means, connected to said capacitor, for initiating a predetermined control function in response to the capacitor being charged a predetermined amount.

References Cited by the Examiner

UNITED STATES PATENTS

| 2,942,123 | 6/60 | Schuh | 317—148.5 |
| 3,079,533 | 2/63 | Kotheimer | 317—36 |

SAMUEL BERNSTEIN, *Primary Examiner.*